US010671865B2

(12) United States Patent
Kim

(10) Patent No.: US 10,671,865 B2
(45) Date of Patent: Jun. 2, 2020

(54) AUTONOMOUS VEHICLE CONTROL METHOD AND APPARATUS

(71) Applicant: Samsung Electronics Co., Ltd., Suwon-si (KR)

(72) Inventor: Changhyun Kim, Seongnam-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 207 days.

(21) Appl. No.: 15/708,978

(22) Filed: Sep. 19, 2017

(65) Prior Publication Data

US 2018/0232585 A1 Aug. 16, 2018

(30) Foreign Application Priority Data

Feb. 16, 2017 (KR) ........................ 10-2017-0021228

(51) Int. Cl.
*G06K 9/00* (2006.01)
*G05D 1/00* (2006.01)
(Continued)

(52) U.S. Cl.
CPC ....... *G06K 9/00825* (2013.01); *G05D 1/0088* (2013.01); *G05D 1/0246* (2013.01);
(Continued)

(58) Field of Classification Search
CPC . G06K 9/00825; G05D 1/0088; G05D 1/0246
See application file for complete search history.

(56) References Cited

U.S. PATENT DOCUMENTS 7,016,783 B2  3/2006  Hac et al.
7,233,933 B2  6/2007  Horvitz et al.
(Continued)

FOREIGN PATENT DOCUMENTS

KR  10-0254974 B1  5/2000
KR  10-1220542 B1  1/2013
(Continued)

OTHER PUBLICATIONS

C. Chen, et al., "DeepDriving: Learning Affordance for Direct Perception in Autonomous Driving," *Proceedings of the IEEE International Conference on Computer Vision*, Dec. 2015, pp. 1-9.
(Continued)

*Primary Examiner* — Adam M Alharbi
(74) *Attorney, Agent, or Firm* — Sughrue Mion, PLLC

(57) ABSTRACT

A processor implemented vehicle control method for autonomous driving includes: obtaining a driving image of a vehicle; determining a control parameter for controlling the vehicle in response to a driving situation of the vehicle by applying the driving image to a neural network; and transmitting the control parameter to an electronic control unit (ECU) of the vehicle for controlling the vehicle to drive autonomously, wherein the neural network comprises first layers in a convolutional structure and second layers in a recurrent structure, the driving image is applied to a first layer among the first layers, a last layer among the first layers is connected with a first layer among the second layers, and the control parameter is output from a last layer among the second layers.

16 Claims, 12 Drawing Sheets

(51) Int. Cl.
  *G05D 1/02* (2020.01)
  *G08G 1/16* (2006.01)
  *G06N 3/08* (2006.01)
  *G06N 3/04* (2006.01)
(52) U.S. Cl.
  CPC ....... *G06K 9/00798* (2013.01); *G06N 3/0445* (2013.01); *G06N 3/0454* (2013.01); *G06N 3/08* (2013.01); *G08G 1/167* (2013.01); *B60W 2420/42* (2013.01); *G05D 2201/0213* (2013.01); *G06K 9/00805* (2013.01); *G06K 2209/23* (2013.01); *G06T 2207/30256* (2013.01)

(56) References Cited

U.S. PATENT DOCUMENTS

| | | | |
|---|---|---|---|
| 8,126,642 | B2 | 2/2012 | Trepagnier et al. |
| 8,401,733 | B2 | 3/2013 | Weslati et al. |
| 9,330,571 | B2 | 5/2016 | Ferguson et al. |
| 2018/0232585 | A1* | 8/2018 | Kim .................. G06K 9/00825 |

FOREIGN PATENT DOCUMENTS

| | | |
|---|---|---|
| KR | 10-2014-0034996 A | 3/2014 |
| KR | 10-2015-0066303 A | 6/2015 |
| KR | 10-2015-0085335 A | 7/2015 |
| KR | 10-2018-0019309 A | 2/2018 |
| KR | 10-2018-0025587 A | 3/2018 |
| KR | 10-2018-0025603 A | 3/2018 |
| KR | 10-2018-0051836 A | 5/2018 |
| KR | 10-2018-0060782 A | 6/2018 |
| KR | 10-2018-0061686 A | 6/2018 |

OTHER PUBLICATIONS

M. Vitelli, et al., "CARMA: A Deep Reinforcement Learning Approach to Autonomous Driving," Stanford Course: Advanced Topics in Sequential Decision Making, 2016, pp. 1-8.

M. Bojarski, et al., "End to End Learning for Self-Driving Cars," *Computer Vision and Pattern Recognition, Cornell University Library*, arXiv:1604.07316, Apr. 2016, pp. 1-9.

S. Shalev-Shwartz, et al., "Long-term Planning by Short-term Prediction," *Computer Science—Learning, Cornell University*, Feb. 2016, pp. 1-7.

Y-J Heo, et al., "Active Learning Using Privileged Information," *Proceedings from the IEEE International Conference on Image Processing*, Phoenix, AZ, Aug. 2016, pp. 900-902.

* cited by examiner

FIG. 1
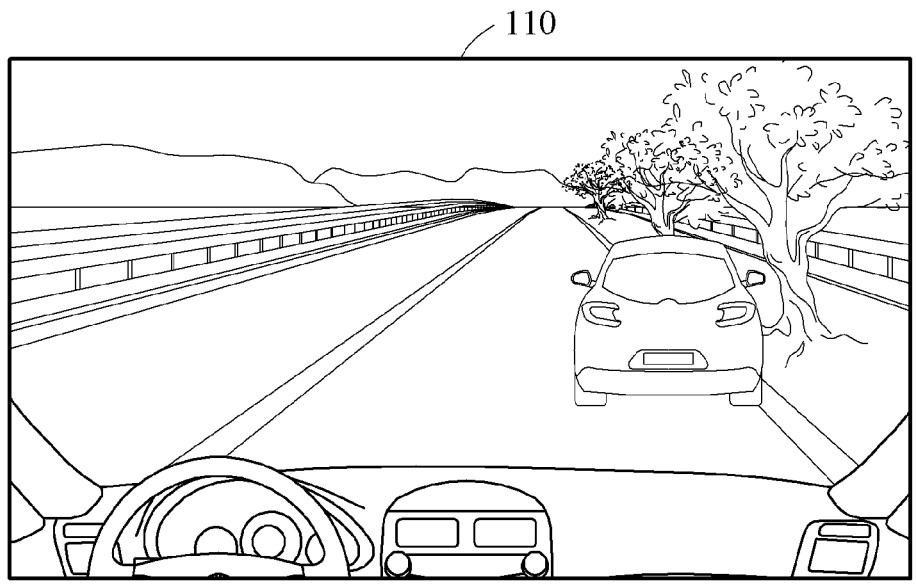
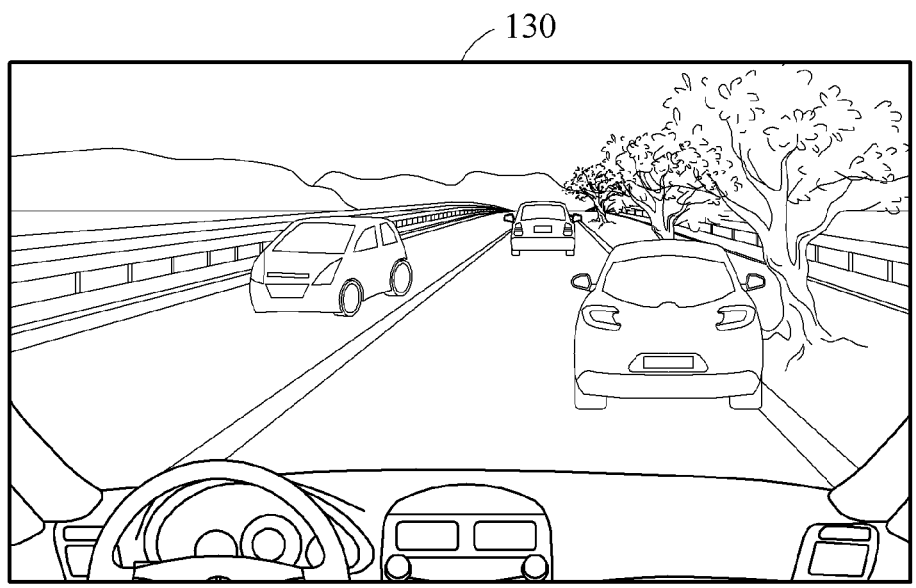

FIG. 8

| Priority | Reference | Specific reference | Weight |
|---|---|---|---|
| 1 | Time to collision (A) | Safe | +++ |
| | | Slightly dangerous | − |
| | | Dangerous | --- |
| | | Crash | all weights=0 |
| 2 | Steering angle (B) | Considerate | +++ |
| | | Normal | + |
| | | Inadequate | --- |
| | | Crash | all weights=0 |
| 3 | Accelerator pedal angle (C) | Considerate | +++ |
| | | Normal | + |
| | | Inadequate | --- |
| | | Crash | all weights=0 |
| 4 | Decelerator pedal angle (D) | Considerate | +++ |
| | | Normal | + |
| | | Inadequate | --- |
| | | Crash | all weights=0 |

FIG. 9
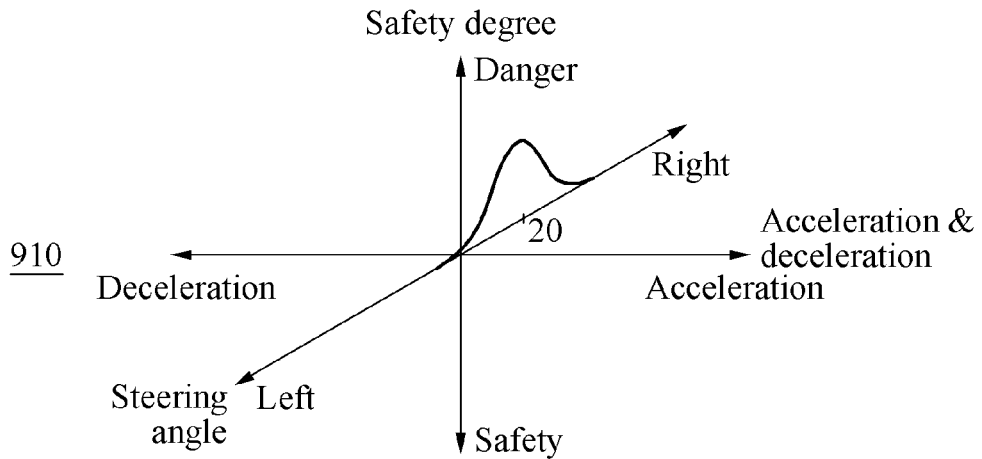
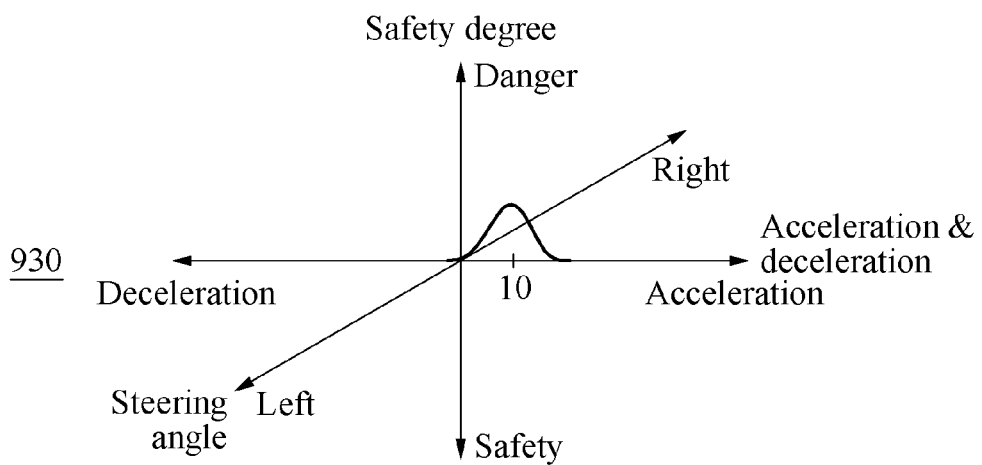
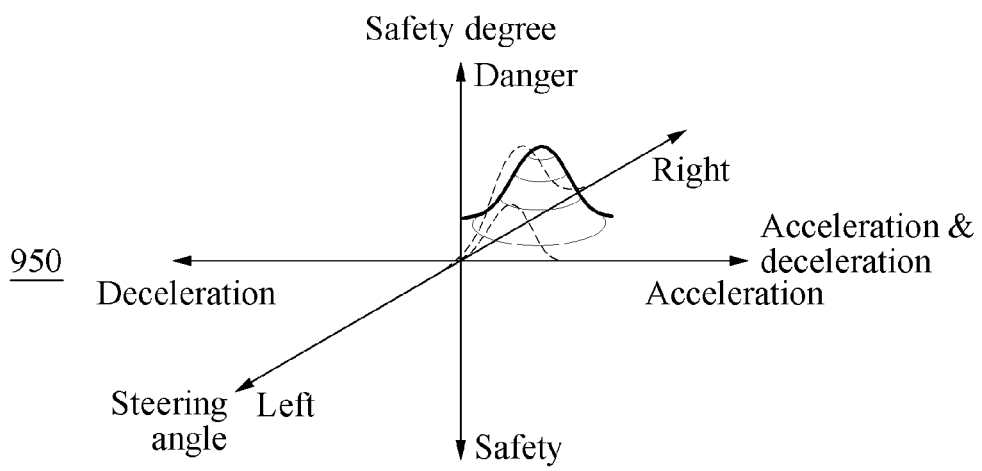

AUTONOMOUS VEHICLE CONTROL METHOD AND APPARATUS

CROSS-REFERENCE TO RELATED APPLICATIONS

This application claims the benefit under 35 USC § 119(a) of Korean Patent Application No. 10-2017-0021228 filed on Feb. 16, 2017, in the Korean Intellectual Property Office, the entire disclosure of which is incorporated herein by reference for all purposes.

BACKGROUND

1. Field

The following description relates to an autonomous vehicle control method and apparatus.

2. Description of Related Art

Autonomous driving may involve a method of autonomously driving without a driver or a method of providing convenience to a driver. Various visual information augmentation realities for assisting steering of a vehicle and other type of transportation may be provided. Methods of providing information for autonomous driving by recognizing information of a lane marking, an opposite vehicle, or a road from a predetermined input image may be used. However, even in a same place, a more effective driving method may exist based on a neighboring vehicle and a traffic situation.

SUMMARY

This Summary is provided to introduce a selection of concepts in a simplified form that are further described below in the Detailed Description. This Summary is not intended to identify key features or essential features of the claimed subject matter, nor is the Summary intended to be used as an aid in determining the scope of the claimed subject matter.

In one general aspect, a processor implemented vehicle control method for autonomous driving includes: obtaining a driving image of a vehicle; determining a control parameter for controlling the vehicle based on a driving situation of the vehicle by applying the driving image to a neural network; and transmitting the control parameter to an electronic control unit (ECU) of the vehicle for controlling the vehicle to drive autonomously, wherein the neural network may include first layers in a convolutional structure and second layers in a recurrent structure, the driving image is applied to a first layer among the first layers, a last layer among the first layers is connected with a first layer among the second layers, and the control parameter is output from a last layer among the second layers.

The control parameter may include either one or both of steering information and acceleration and deceleration information.

The driving situation may be determined by the neural network as one or more feature vectors including information of any one or any combination of any two or more of a position of a neighboring object of the vehicle, a speed of the neighboring object, a distance between the neighboring object and the vehicle, a lane of a road on which the vehicle is driving, a neighboring lane of the lane, and a width of the road.

The neural network may be trained in advance to recognize the driving situation based on a scene of the driving image and to generate the control parameter for a driving control predicted from the driving situation.

The determining of the control parameter may include: receiving a driving mode of the vehicle; and obtaining the control parameter by applying the driving image to a select neural network portion, wherein the select neural network portion is selected based on the received driving mode of the vehicle.

The vehicle control method may further include: calculating a driving evaluation score based on the driving image and the control parameter; and learning a neural network based on a learning weight corresponding to the driving evaluation score.

In another general aspect, a processor implemented vehicle control method includes: obtaining a driving image of a vehicle; receiving a control parameter for controlling the vehicle at a point in time at which the driving image is obtained; calculating a driving evaluation score based on the driving image and the control parameter; and learning a neural network including first layers in a convolutional structure and second layers in a recurrent structure based on a learning weight corresponding to the driving evaluation score.

The learning of the neural network may include repeatedly learning the neural network a number of times corresponding to the learning weight.

The control parameter may include either one or both of steering information and acceleration and deceleration information.

The calculating of the driving evaluation score may include determining the driving evaluation score based on the control parameter and on a scene of the driving image.

The calculating of the driving evaluation score may include determining the driving evaluation score based on a scene of the driving image and on a lookup table that stores driving evaluation scores based on a predetermined scene and a predetermined control parameter corresponding to the predetermined scene.

The obtaining of the driving image may include: receiving the driving image including a plurality of frames; and extracting, from the frames, a frame corresponding to a change in the control parameter.

The vehicle control method may further include determining another control parameter for controlling the vehicle by applying another driving image to the first layers of the trained neural network and determining the other control parameter from the second layers of the trained neural network.

The learning method may further include: receiving a driving mode of the vehicle, wherein the calculating of the driving evaluation score may include calculating the driving evaluation score by assigning different weights corresponding to the driving mode of the vehicle to scores for each of a plurality of preset evaluation items, wherein the scores are based on either one or both of the driving image and the control parameter.

In another general aspect, a vehicle control method for autonomous driving includes: obtaining a driving image of a vehicle; determining information corresponding to a driving situation based on the driving image; obtaining a first control parameter for controlling the vehicle at a first point in time at which the driving image is obtained; determining a second control parameter for controlling the vehicle at a second point in time subsequent to the first point in time based on the information corresponding to the driving situation and the first control parameter; and transmitting the second control parameter to an electronic control unit (ECU) of the vehicle for controlling the vehicle to drive autonomously.

The each of the first control parameter and the second control parameter may include either one or both of steering information and acceleration and deceleration information.

The information corresponding to the driving situation may include a feature vector including information of any one or any combination of any two or more of a position of a neighboring object of the vehicle, a speed of the neighboring object, a distance between the neighboring object and the vehicle, a lane of a road on which the vehicle is driving, a neighboring lane of the lane, and a width of the road.

The determining of the information corresponding to the driving situation may include determining the information corresponding to the driving situation by applying the driving image to a first neural network configured to recognize the driving situation.

The first neural network may include a pre-learned convolutional neural network to recognize the driving situation based on the driving image.

The determining of the second control parameter may include obtaining the second control parameter by applying the information corresponding to the driving situation and the first control parameter to a second neural network configured to predict the second control parameter.

The second neural network may include a pre-learned recurrent neural network to generate the second control parameter based on the information corresponding to the driving situation and the first control parameter.

The determining of the second control parameter may include: receiving a driving mode of the vehicle; and obtaining the second control parameter by applying the information corresponding to the driving situation and the first control parameter to a second neural network corresponding to the driving mode of the vehicle.

In another general aspect, a learning method may include: obtaining a driving image of a vehicle; determining information corresponding to a driving situation by applying the driving image to a first neural network configured to recognize the driving situation in the driving image; obtaining a first control parameter for controlling the vehicle at a first point in time at which the driving image is obtained; calculating a driving evaluation score based on the information corresponding to the driving situation and the first control parameter; and learning a second neural network configure to predict a second control parameter for controlling the vehicle at a second point in time subsequent to the first point in time based on a learning weight corresponding to the driving evaluation score.

The learning of the second neural network may include repeatedly learning the second neural network a number of times corresponding to the learning weight.

The calculating may include any one or any combination of any two or more of: determining a driving evaluation score based on the first control parameter and the information corresponding to the driving situation; determining the driving evaluation score based on the information corresponding to the driving situation, the first control parameter, and on a lookup table, wherein the lookup table stores driving evaluation scores based on a predetermined scene and a predetermined first control parameter corresponding to the information corresponding to the driving situation in the predetermined scene; and calculating the driving evaluation score by assigning a score to each of a plurality of preset evaluation items based on the information corresponding to the driving situation and the first control parameter.

The obtaining of the driving image may include: receiving the driving image including a plurality of frames; and extracting, from the frames, a frame corresponding to a change in the first control parameter.

The first neural network may include a pre-learned convolutional neural network configured to output the information corresponding to the driving situation by recognizing the driving situation based on a scene of the driving image; and the second neural network may include a pre-learned recurrent neural network configured to generate the second control parameter for controlling the vehicle at a second point in time subsequent to the first point in time based on the driving evaluation score, wherein the driving evaluation score is based on scores for each of a plurality of preset evaluation items, and the scores are based on either one or both of the information corresponding to the driving situation and the first control parameter.

The learning method may further include: receiving a driving mode of the vehicle, wherein the calculating of the driving evaluation score may include calculating the driving evaluation score by assigning different weights corresponding to the driving mode of the vehicle to scores for each of a plurality of preset evaluation items, wherein the scores are based on either one or both of the driving image and the first control parameter.

A non-transitory computer-readable storage medium may store instructions that, when executed by a processor, cause the processor to perform the method of claim 1.

In another general aspect, a vehicle control apparatus for autonomous driving includes: an input interface configured to receive a driving image of a vehicle; a processor configured to determine a control parameter for controlling the vehicle based on a driving situation of the vehicle by applying the driving image to a neural network; and an output interface configured to transmit the control parameter to an electronic control unit (ECU) of the vehicle for controlling the vehicle to drive autonomously, wherein the neural network may include first layers in a convolutional structure and second layers in a recurrent structure, the driving image is applied to a first layer among the first layers, a last layer among the first layers is connected with a first layer among the second layers, and the control parameter is output from a last layer among the second layers.

In another general aspect, a vehicle control apparatus for autonomous driving includes: an input interface configured to receive a driving image of a vehicle; a processor configured to: determine information corresponding to a driving situation based on the driving image, obtain a first control parameter for controlling the vehicle at a first point in time at which the driving image is obtained, and determine a second control parameter for controlling the vehicle at a second point in time subsequent to the first point in time based on the information corresponding to the driving situation and the first control parameter; and an output interface configured to transmit the second control parameter to an electronic control unit (ECU) of the vehicle for controlling the vehicle to drive autonomously.

Other features and aspects will be apparent from the following detailed description, the drawings, and the claims.

BRIEF DESCRIPTION OF THE DRAWINGS

FIG. 1 illustrates examples of using different driving methods in response to driving situations.

FIG. 8 illustrates a table illustrating an example of scores for a plurality of evaluation items and weights assigned to each of the evaluation items.

FIG. 9 illustrates examples of a method of calculating a driving evaluation score.

Figure 2:
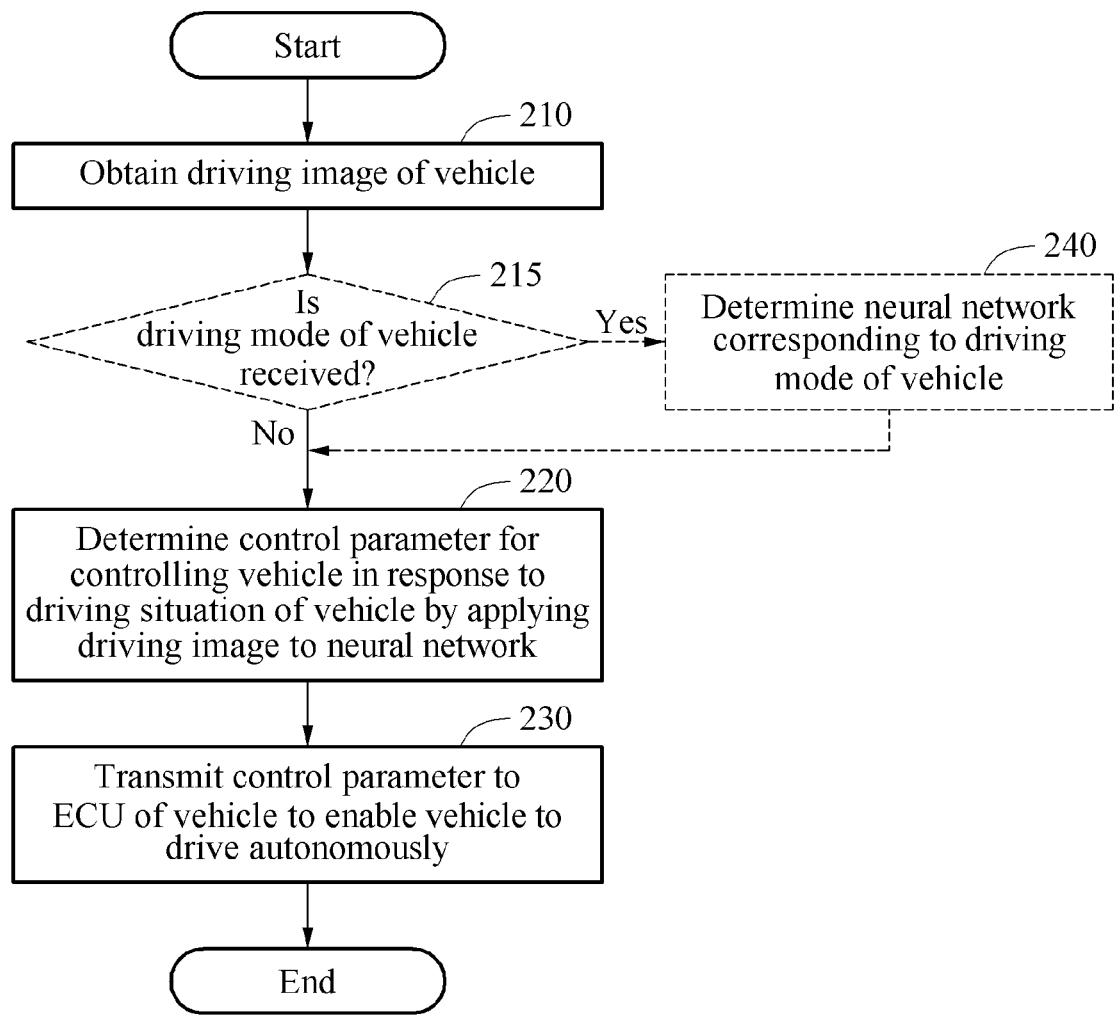
FIG. 2 is a flowchart illustrating an example of a vehicle control method for autonomous driving.

Throughout the drawings and the detailed description, unless otherwise described or provided, the same drawing reference numerals will be understood to refer to the same or like elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known in the art may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

Specific structural or functional descriptions of examples provided in the present disclosure are exemplary to merely describe the examples. The examples may be modified and implemented in various forms, and the scope of the examples is not limited to the descriptions provided in the present specification.

As used herein, the term "and/or" includes any one and any combination of any two or more of the associated listed items.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

Spatially relative terms such as "above," "upper," "below," and "lower" may be used herein for ease of description to describe one element's relationship to another element as shown in the figures. Such spatially relative terms are intended to encompass different orientations of the device in use or operation in addition to the orientation depicted in the figures. For example, if the device in the figures is turned over, an element described as being "above" or "upper" relative to another element will then be "below" or "lower" relative to the other element. Thus, the term "above" encompasses both the above and below orientations depending on the spatial orientation of the device. The device may also be oriented in other ways (for example, rotated 90 degrees or at other orientations), and the spatially relative terms used herein are to be interpreted accordingly.

Throughout the specification, when an element, such as a layer, region, or substrate, is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween.

The terminology used herein is for describing various examples only, and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

The features of the examples described herein may be combined in various ways as will be apparent after an understanding of the disclosure of this application. Further, although the examples described herein have a variety of configurations, other configurations are possible as will be apparent after an understanding of the disclosure of this application.

Unless otherwise defined, all terms including technical and scientific terms used herein have the same meaning as commonly understood by one of ordinary skill in the art in view of the present disclosure. It will be further understood that terms, such as those defined in commonly-used dictionaries, should be interpreted as having a meaning that is consistent with their meaning in the context of the relevant art and the present disclosure, and will not be interpreted in an idealized or overly formal sense unless expressly so defined herein.

Examples may be applied to generate information for controlling a vehicle in a smart vehicle or an autonomous driving vehicle, for example. In addition, the examples may be used to assist a user in driving a vehicle safely and comfortably based on a driving habit of the user, a driving mode of the vehicle, and a driving situation by analyzing visual information in a device including an intelligent system installed in a vehicle for driving assistance or fully autonomous driving, for example. The examples may be implemented as various types of products, for example, an autonomous driving vehicle, an intelligent vehicle, a smartphone, and a mobile device.

FIG. 1 illustrates examples of using different driving methods in response to ambient traffic situations. FIG. 1 illustrates different ambient situations 110 and 130 when another vehicle is parked or stationary in a driving lane of one-lane road on which a driving vehicle is moving.

The first situation 110 indicates that another vehicle is parked or stationary in the driving lane while an opposite lane is empty. The second situation 130 indicates that another vehicle is parked or stationary in the driving lane while a vehicle is driving in the opposite lane.

For example, a driving vehicle in the driving lane may slightly cross over a center line to avoid another vehicle parked in the driving lane if the opposite lane is empty. Here, a driver of the driving vehicle may determine whether to proceed with driving, based on a distance with a vehicle ahead of the driving vehicle and whether a vehicle is seen from the opposite lane. In the first situation 110, when the driving vehicle in the driving lane stops driving to follow traffic regulations and waits to drive until another vehicle in the driving lane starts moving, a risk of an accident may increase because a point in time at which the other vehicle in the driving lane starts moving may be unknown and a traffic flow may be interrupted while the driving vehicle keeps waiting in the driving lane. Thus, it may be more appropriate to drive quickly without interrupting the traffic flow by slightly crossing over the center line than to stop driving to follow traffic regulations.

In the second situation 130, because a driving vehicle is present in the opposite lane, it may be more appropriate to wait to drive until another vehicle parked in the driving lane starts moving, or until after the driving vehicle in the opposite lane passes instead of crossing over the center line.

Thus, a driving method may be varied depending on ambient traffic situations even in a same place. For example, even if traffic situations similarly involve a vehicle parked in the driving lane, the driving method for those traffic situations may differ based on their respective ambient traffic situations. Accordingly, a vehicle control for autonomous driving may be also varied.

FIG. 2 is a flowchart illustrating an example of a vehicle control method for autonomous driving. Referring to FIG. 2, in operation 210, a vehicle control apparatus, hereinafter referred to as a control apparatus, for autonomous driving obtains a driving image of a vehicle. For example, the driving image is photographed by an image sensor of the vehicle or received from an external photographing apparatus.

In operation 220, the control apparatus determines a control parameter for controlling the vehicle in response to a driving situation of the vehicle by applying the driving image to a neural network. The neural network is trained or learned in advance to recognize the driving situation based on a scene of the driving image and to generate the control parameter for a driving control predicted from the driving situation. Detailed description of an example structure of the neural network is provided with reference to FIG. 3.

The driving situation of the vehicle may include information of any one or any combination of any two or more of, for example, a position of one or more neighboring objects of the vehicle, speeds of the one or more neighboring objects, distances between the one or more neighboring objects and the vehicle, a lane of a road on which the vehicle is driving, neighboring lanes of the lane, and widths of the road or lanes.

The control parameter may include steering information, acceleration and deceleration information, or various combinations thereof. The control parameter includes, as non-limiting examples, an acceleration, an accelerator pedal angle (accelerator angle), a deceleration, and a decelerator pedal angle (brake angle).

In operation 230, the control apparatus transmits the control parameter to an electronic control unit (ECU) of the vehicle to enable the vehicle to drive autonomously. Alternatively, the control apparatus is included in or representative of the ECU.

Operations 215 and 240 indicated in dotted lines may be selectively performed as needed. In operation 215, the control apparatus verifies whether a driving mode of the vehicle is received (or set). The driving mode of the vehicle may be directly input or set by a user, or set as default. The driving mode of the vehicle may be any one or any combination of any two or more of, as non-limiting examples, an eco mode for fuel efficiency, a sport mode for active and speedy driving, a safety mode, and a normal mode.

The eco mode may allow a vehicle to change a speed in a state in which an output torque of an engine is less than that in the normal mode in order to prevent the output torque of the engine from being excessively increased for fuel efficiency. For example, a sudden change in acceleration and deceleration information (for example, a rapid acceleration or a sudden start) may not occur during the eco mode. The sport mode may allow the vehicle to change a speed in a state in which the output torque of the engine is greater than that in the normal mode in order to allow a driver to enjoy more active driving. For example, a sudden change in steering or a sudden change in acceleration and deceleration information (for example, a rapid acceleration or a sudden start) may occur during the sport mode. The safety mode may prevent an acceleration that exceeds a regulation speed, a sudden change in steering, or a sudden change in acceleration and deceleration information (for example, a rapid acceleration or a sudden start).

Based on a result of the verifying that the driving mode of the vehicle is not received or set in operation 215, operation 220 is performed using a predetermined neural network. Based on the result of the verifying that the driving mode of the vehicle is set in operation 215, the control apparatus determines a neural network corresponding to the driving mode of the vehicle in operation 240. As will be described in detail below, different neural networks may be trained or learned for each driving mode of the vehicle.

Figure 3:
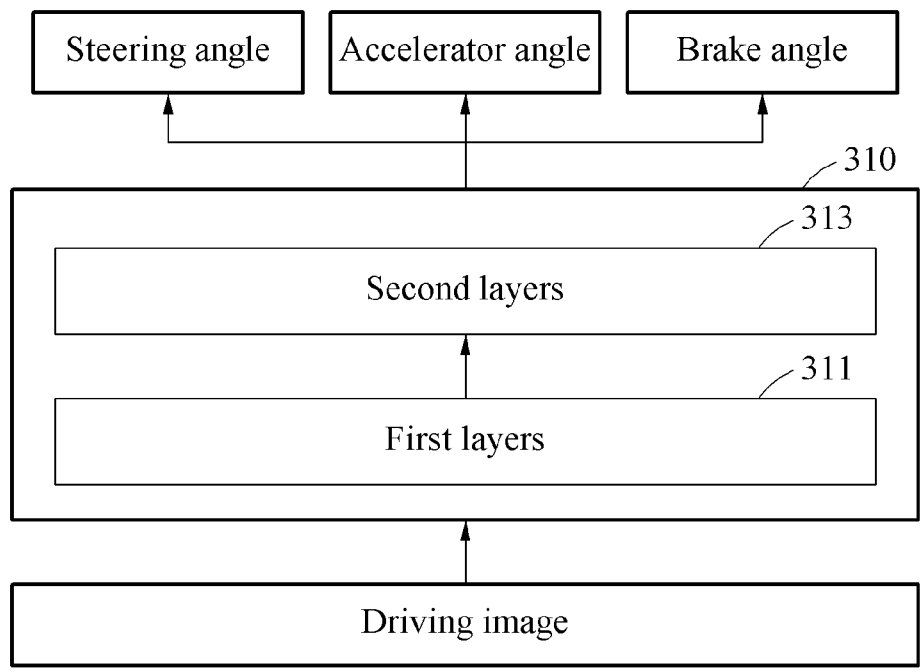
FIG. 3 illustrates an example of a structure of a neural network for controlling a vehicle.

FIG. 3 illustrates an example of a structure of a neural network for controlling a vehicle. Referring to FIG. 3, a neural network 310 includes first layers 311 in a convolutional structure and second layers 313 in a recurrent structure. In another example, neural network 310 may be in any type of feed-forward structure.

The neural network 310 may be learned in advance to recognize a driving situation based on a scene of a driving image and to generate control parameters for a driving control predicted from the driving situation.

The neural network 310 may output a control parameter for controlling a vehicle in response to the driving situation of the vehicle. The neural network 310 may output all control parameters (steering angle, accelerator angle, and brake angle) based on the driving situation of the vehicle or output a required portion (for example, steering angle or brake angle) of the control parameters.

The driving image is applied to a first layer among the first layers 311 of the neural network 310, and the control parameter may be output from a last layer among the second layers 313. Here, a last layer among the first layers 311 is connected with a first layer among the second layers 313.

Figure 4:
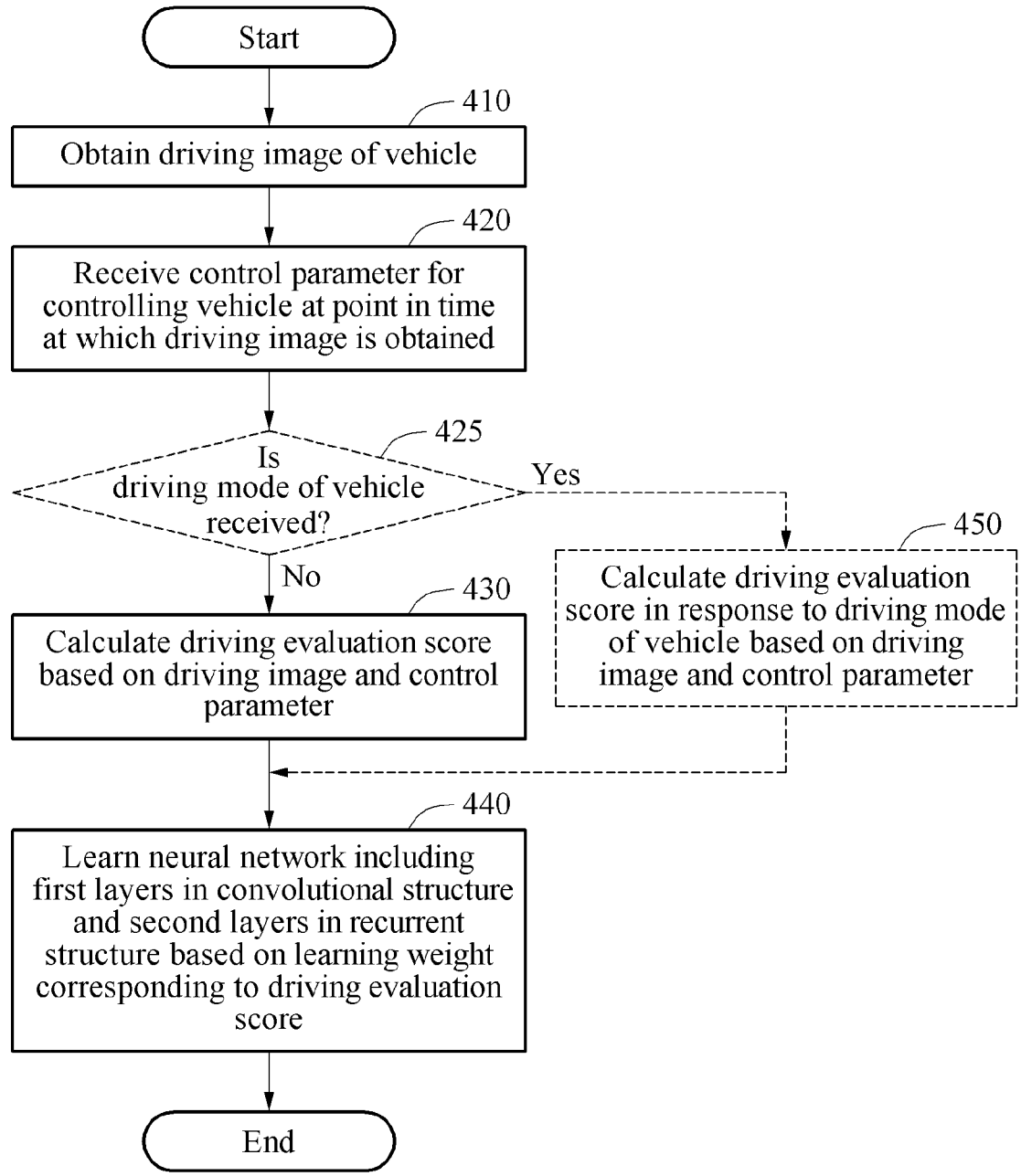
FIG. 4 is a flowchart illustrating an example of a learning method for controlling a vehicle.

FIG. 4 is a flowchart illustrating an example of a learning method for controlling a vehicle. Referring to FIG. 4, an end-to-end learning process is described.

In operation 410, a learning apparatus obtains a driving image of a vehicle. In operation 420, the learning apparatus receives a control parameter for controlling the vehicle at a point in time at which the driving image is obtained.

Here, a control parameter, for example, a steering angle, an accelerator angle, and a brake angle, may be labeled or mapped with respect to the driving image. In more detail, for example, a steering angle label, an accelerator angle label, and a brake angle label may be mapped to the driving image. Detailed description of a method by which the learning apparatus obtains the driving image is provided with reference to FIG. 10.

In operation 430, the learning apparatus calculates a driving evaluation score based on the driving image and the control parameter. The learning apparatus may determine the driving evaluation score depending on a combination of control parameters based on a scene of the driving image.

The learning apparatus may determine the driving evaluation score depending on the scene of the driving image and the combination of the control parameters based on a lookup table that stores driving evaluation scores depending on a predetermined scene and combinations of predetermined control parameters corresponding to the predetermined scene.

Alternatively, the learning apparatus may calculate the driving evaluation score by assigning a score to each of a plurality of preset evaluation items based on the driving image and the control parameter. In an example, the learning apparatus calculates the driving evaluation score by assigning different weights corresponding to a driving mode of the vehicle to scores for each of the preset evaluation items based on the driving image and the control parameter.

Detailed description of a method by which the learning apparatus calculates the driving evaluation score is provided with reference to FIGS. 8 and 9. In an example, the driving evaluation score is mapped to the driving image.

In operation 440, the learning apparatus learns a neural network including first layers in a convolutional structure and second layers in a recurrent structure based on a learning weight corresponding to the driving evaluation score. In an example, the learning apparatus repeatedly learns a neural network a number of times corresponding to the learning weight based on the driving image and the control parameter mapped to the driving image. Here, as a non-limiting example, to learn or train a neural network may mean that the output of a layer of a neural network is compared with a known output, and that the errors or differences between the output and the known output is fed back into the neural network, wherein connection weights between nodes of the neural network may be altered or updated based on the errors or differences. This process may then be repeated, as the neural network may be repeatedly learned a number of times corresponding to the learning weight.

For example, the learning apparatus may set the learning weight to be 10 for scenes (feature vectors or feature maps corresponding to scenes) that receive a driving evaluation score 10. In this example, the learning apparatus may repeatedly learn the neural network ten times using the control parameter and the driving image of which the learning weight is 10. Alternatively, the learning apparatus may set the learning weight to be 5 for scenes (feature vectors or feature maps corresponding to scenes) that receive a driving evaluation score 5. In this example, the learning apparatus may repeatedly learn the neural network five times using the control parameter and the driving image of which the learning weight is 5.

Operations 425 and 450 indicated in dotted lines may be selectively performed as needed. In operation 425, the learning apparatus verifies whether the driving mode of the vehicle is set (or received). Based on a result of the verifying that the driving mode of the vehicle is not set in operation 425, operation 430 may be performed.

Based on the result of the verifying that the driving mode of the vehicle is set in operation 425, the learning apparatus calculates the driving evaluation score depending on the driving mode of the vehicle based on the driving image and the control parameter in operation 450. As will be described in detail below, different evaluation scores may be calculated for each driving mode of the vehicle and thus, different neural networks may respectively be trained or learned for each driving mode of the vehicle.

Figure 5:
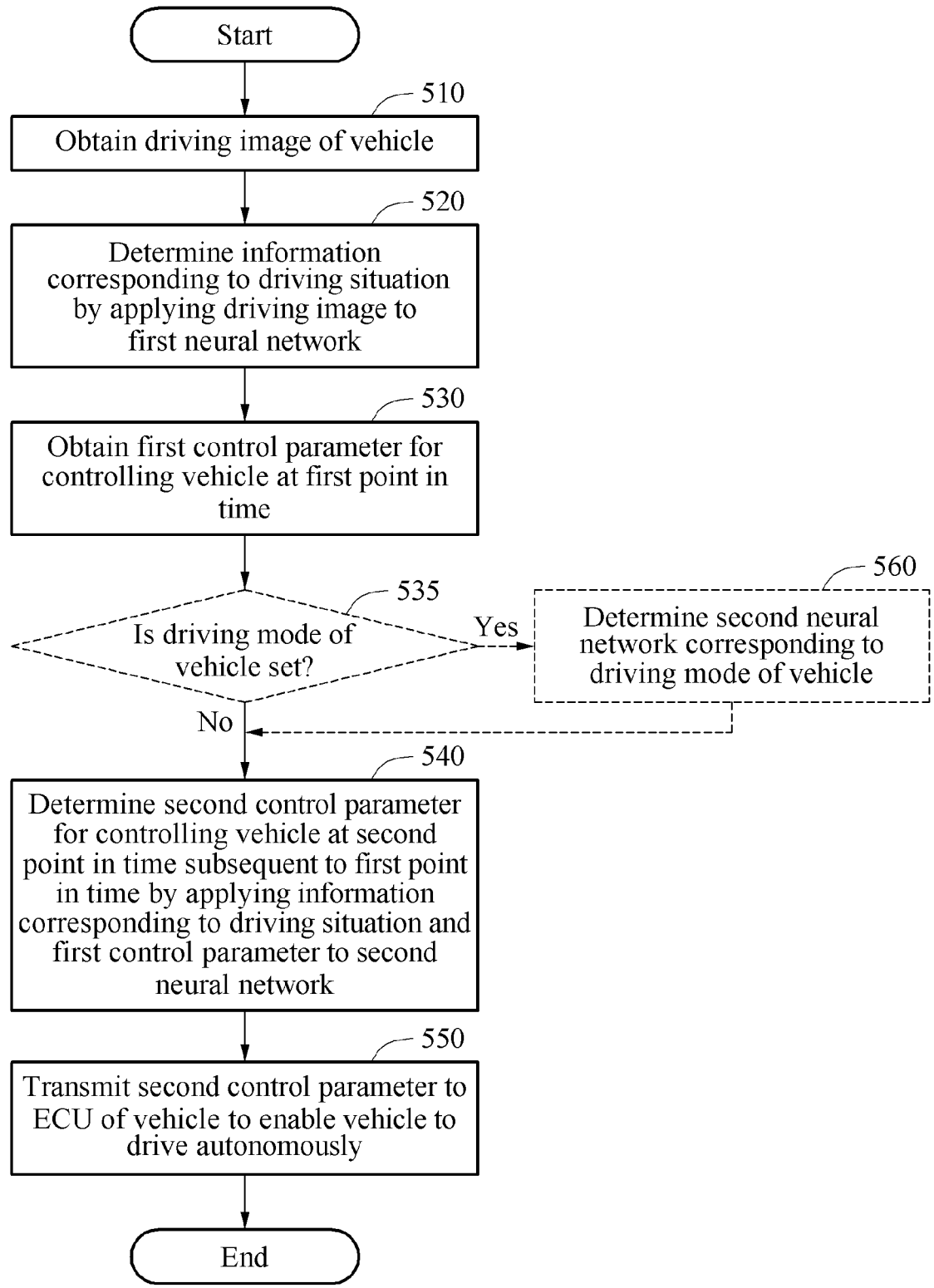
FIG. 5 is a flowchart illustrating an example of a vehicle control method for autonomous driving.

FIG. 5 is a flowchart illustrating another example of a vehicle control method for autonomous driving. Referring to FIG. 5, in operation 510, a vehicle control apparatus, hereinafter referred to as a control apparatus, for autonomous driving obtains a driving image of a vehicle. In operation 520, the control apparatus determines information corresponding to a driving situation by applying the driving image to a first neural network. The control apparatus may determine the information corresponding to the driving situation by applying the driving image to the first neural network that recognizes the driving situation. Here, the first neural network may include a convolutional neural network (CNN) that is learned in advance to recognize the driving situation based on the driving image. In an example, the driving apparatus obtains and uses various pieces of sensor information in addition to the driving image to determine the information corresponding to the driving situation, e.g., as a result of the example CNN.

The information corresponding to the driving situation may include a feature vector or a feature map including information of, for example, a position of a neighboring object of a driving vehicle, a speed of the neighboring object, a distance between the neighboring object and the vehicle, a lane of a road on which the vehicle is driving, a neighboring lane of the lane, or a width of the road. The neighboring object may include, for example, a vehicle driving in the vicinity, a vehicle parked (or stopped) in the vicinity, a pedestrian, a lane, and other obstacles (animal, plant, rock, and garbage).

In operation 530, the control apparatus obtains a first control parameter for controlling the vehicle at a first point in time. The first control parameter may be obtained by monitoring the actual vehicle driving (operating) of a user (or driver). The first control parameter may include steering information, for example, a steering angle, acceleration and deceleration information, for example, an acceleration, an accelerator pedal angle (accelerator angle), a deceleration, and a decelerator pedal angle (brake angle), of the user (or driver) at the first point in time, or various combinations thereof.

In operation 540, the control apparatus determines a second control parameter for controlling the vehicle at a second point in time subsequent to the first point in time by applying the information corresponding to the driving situation and the first control parameter to a second neural network. The control apparatus may obtain the second control parameter by applying the information corresponding to the driving situation and the first control parameter to the second neural network that is configured to predict or estimate the second control parameter.

Here, the first point in time and the second point in time may correspond to points in time according to a time sequential order. The second point in time may be a point in time subsequent to the first point in time. For example, in response to the first point in time corresponding to a current point in time, the second point in time may correspond to a point in time after 3 seconds to 10 seconds from the current point in time.

The second neural network may include a recurrent neural network (RNN) that is learned in advance to generate the second control parameter based on the information corresponding to the driving situation and the first control parameter. The second control parameter may include, for example, steering information, for example, a steering angle, acceleration and deceleration information, for example, an acceleration, an accelerator pedal angle (accelerator angle), a deceleration, and a decelerator pedal angle (brake angle), at the second point in time, and various combinations thereof.

In operation 550, the control apparatus transmits the second control parameter to an electronic control unit (ECU) of the vehicle to enable the vehicle to drive autonomously or provides (e.g., displays) information related to the second control parameter to the user, e.g., as a driving suggestion or warning.

Operations 535 and 560 indicated in dotted lines may be selectively performed as needed. In operation 535, the control apparatus verifies whether a driving mode of the vehicle is set. Based on a result of the verifying that the driving mode of the vehicle is not set in operation 535, operation 540 is performed.

Based on the result of the verifying that the driving mode of the vehicle is set in operation 535, the control apparatus determines the second neural network corresponding to the driving mode of the vehicle in operation 560. In this example, the control apparatus may determine the second control parameter by further considering the driving mode of the vehicle. In operation 540, the control apparatus determines the second control parameter for controlling the vehicle at the second point in time subsequent to the first point in time by applying the information corresponding to the driving situation and the first control parameter to the second neural network determined in operation 560.

Figure 6:
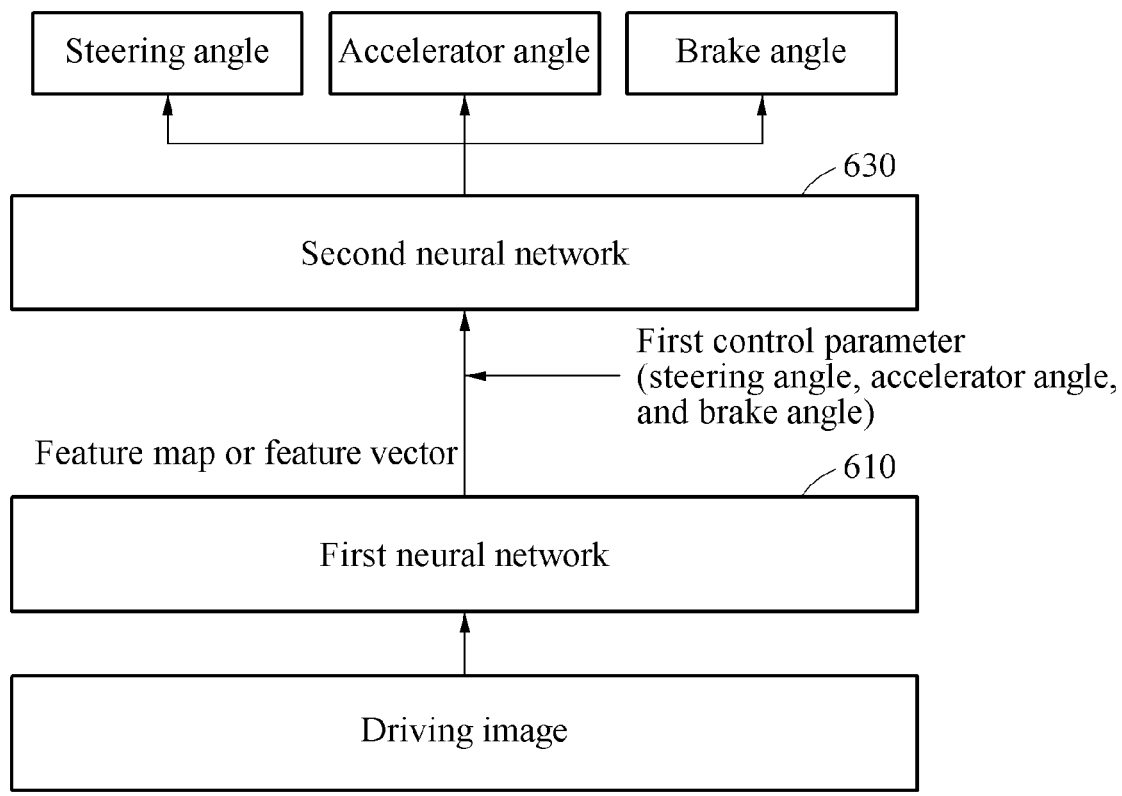
FIG. 6 illustrates an example of a structure of a neural network for autonomous driving.

FIG. 6 illustrates another example of a structure of a neural network for autonomous driving. FIG. 6 illustrates a first neural network 610 including first layers and a second neural network 630 including second layers. The first and second layers may also be respective first and second levels of a single neural network.

The first neural network 610 may perform basic recognition for understanding a three-dimensional (3D) scene including, for example, a neighboring object (dynamic object and static object) of a vehicle, a road, a distance (current position), and a surrounding environment by extracting a feature from a driving image. A driving situation of the driving image may be recognized through the first neural network 610.

The first neural network 610 may include a convolutional neural network (CNN) that is learned in advance to recognize the driving situation based on the driving image. The driving situation may include, for example, a position of a neighboring object of the vehicle, a speed of the neighboring object, a distance between the neighboring object and the vehicle, a lane of a road on which the vehicle is driving, a neighboring lane of the lane, and a width of the road.

The first neural network 610 may output information corresponding to the driving situation by the pre-learned CNN. The output information corresponding to the driving situation may include a feature vector or a feature map including information of any one or any combination of any two or more of a position of a neighboring object of the vehicle, a speed of the neighboring object, a distance between the neighboring object and the vehicle, a lane of a road on which the vehicle is driving, a neighboring lane of the lane, and a width of the road.

A first control parameter and the information corresponding to the driving situation output from the first neural network 610 may be applied to the second neural network 630. Here, the first control parameter may be obtained through actual vehicle driving (operating) of a user (or driver).

The second neural network 630 that receives the first control parameter and the information corresponding to the driving situation may be configured to predict and output a second control parameter for controlling the vehicle at a second point in time.

For example, the second neural network 630 outputs the second control parameter for a driving control at the second point in time based on the information corresponding to the driving situation of sequential scenes of one to ten seconds at a first point in time and the first control parameter of the sequential scenes of one to ten seconds at the first point in time. The second control parameter may include steering information and acceleration and deceleration information for the driving control predicted at the second point in time.

The second neural network 630 may output all second control parameters (steering angle, accelerator angle, and brake angle) based on the driving situation of the vehicle or output a required portion (for example, steering angle or brake angle) of the second control parameters.

The second neural network 630 may include a pre-learned recurrent neural network (RNN) to generate the second control parameter for the driving control predicted from the driving situation based on a driving evaluation score calculated depending on scores for each of a plurality of preset evaluation items based on the information corresponding to the driving situation and the first control parameter. The second neural network 630 may be, for example, a long short term memory (LSTM) recurrent neural network or a gated recurrent unit (GRU) recurrent neural network.

The steering angle, the accelerator angle, and the brake angle output from the second neural network 630 may be transmitted to an electronic control unit (ECU) of the vehicle and used for a driving control of an autonomous driving vehicle. Alternatively, the control apparatus that includes the first and second neural networks 610 and 630 may be representative of the ECU.

Examples may be implemented by various machine learning algorithms, for example, a reinforcement learning algorithm in addition to the CNN and the RNN.

Figure 7:
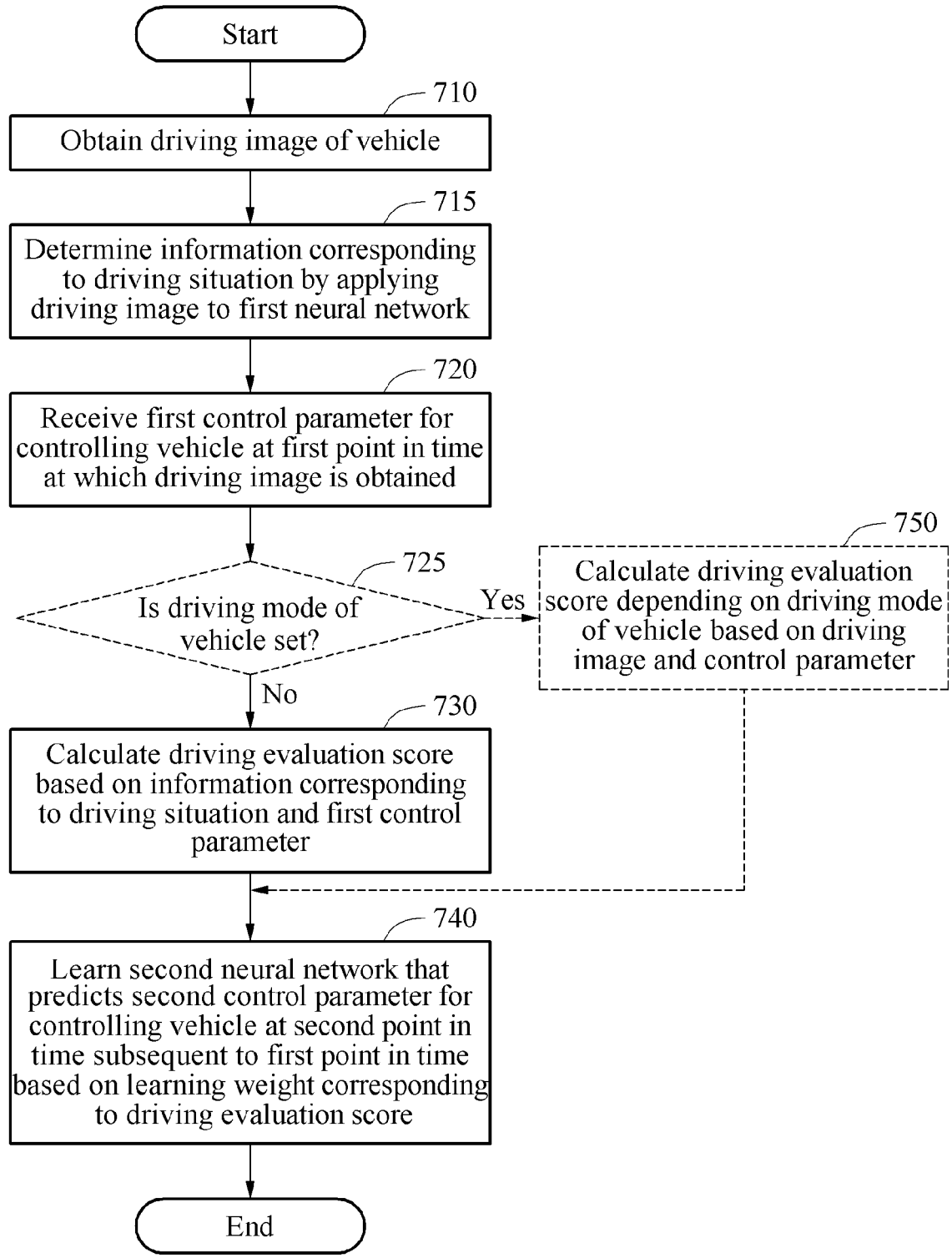
FIG. 7 is a flowchart illustrating an example of a learning method for controlling a vehicle.

FIG. 7 is a flowchart illustrating another example of a learning method for controlling a vehicle. Referring to FIG. 7, a learning method by fine tuning is described.

In operation 710, a learning apparatus obtains a driving image of a vehicle. Detailed description of a method by which the learning apparatus obtains the driving image is provided with reference to FIG. 10.

In operation 715, the learning apparatus determines information corresponding to a driving situation by applying the driving image obtained in operation 710 to a first neural network.

The first neural network may be learned in advance using the driving image and an object label, for example, a distance, a road, and a neighboring object of the vehicle mapped to the driving image. Repeated descriptions will be omitted for increased clarity and conciseness because general machine learning methods are also applicable to a method of learning the first neural network.

In this example, the information corresponding to the driving situation may be determined (or generated) through the first neural network. The resultant information corresponding to the driving situation may include a feature vector or a feature map including information of, for example, a position of a neighboring object of the vehicle, a speed of the neighboring object, a distance between the neighboring object and the vehicle, a lane of a road on which the vehicle is driving, a neighboring lane of the lane, or a width of the road.

In operation 720, the learning apparatus receives a first control parameter for controlling the vehicle at a first point in time at which the driving image is obtained. In operation 730, the learning apparatus calculates a driving evaluation score based on the information corresponding to the driving situation and the first control parameter. For example, the learning apparatus determines the driving evaluation score depending on a combination of first control parameters based on the information corresponding to the driving situation. The learning apparatus may calculate the driving evaluation score by assigning a score to each of a plurality of preset evaluation items based on the information corresponding to the driving situation and the first control parameter. Detailed descriptions of the plurality of preset evaluation items, the score assigned to each of the evaluation items, and a weight assigned to each of the evaluation items are provide with reference to FIG. 8.

Alternatively, the learning apparatus may determine the driving evaluation score depending on the information corresponding to the driving situation and the combination of the first control parameters based on a lookup table that is provided in advance. For example, the lookup table may store driving evaluation scores depending on a predetermined scene and a combination of predetermined first control parameters corresponding to a feature vector (or feature map) of the predetermined scene. The information corresponding to the driving situation may be a feature vector (or feature map) corresponding to the predetermined scene. For example, the predetermined scene may correspond to various places and various driving situations. The first control parameter may be a plurality of predetermined first control parameters corresponding to feature vectors of a plurality of predetermined scenes. The plurality of predetermined first control parameters may include, for example, steering information 1-1 and acceleration and deceleration information 1-1 corresponding to a feature vector (or feature map) of a first scene, steering information and acceleration and deceleration information 1-2 corresponding to the feature vector of the first scene, steering information 1-3 and acceleration and deceleration information 1-3 corresponding to the feature vector of the first scene, through steering information 4-1 and acceleration and deceleration information 4-1 corresponding to a feature vector of a fourth scene.

In an example, the learning apparatus may calculate the driving evaluation score depending on the information corresponding to the driving situation and various combinations of the first control parameters and thus, an effective driving method may be learned based on different driving situations even in a same place.

In operation 740, the learning apparatus learns a second neural network that predicts a second control parameter for controlling the vehicle at a second point in time subsequent to the first point in time based on a learning weight corresponding to the driving evaluation score calculated in operation 730. The learning apparatus may learn the second neural network based on the information (feature vector or feature map) corresponding to the driving situation which is a learning result of the first neural network, a steering angle label, an accelerator angle label, and a brake angle label mapped to the driving image.

Here, the learning apparatus may repeatedly learn the second neural network a number of times corresponding to the learning weight. The learning weight may be set to be a relatively high value in response to the driving evaluation score being high. The learning weight may be set to be a relatively low value in response to the driving evaluation score being low.

In operation 740, the learning apparatus learns the second neural network that predicts the second control parameter for controlling the vehicle at the second point in time subsequent to the first point in time based on the learning weight corresponding to the driving evaluation score.

Operations 725 and 750 indicated in dotted lines may be selectively performed according to an example. In operation 725, the learning apparatus verifies whether a driving mode of the vehicle is set. Based on a result of the verifying that the driving mode of the vehicle is not set in operation 725, operation 730 is performed.

Based on the result of the verifying that the driving mode of the vehicle is set in operation 725, the learning apparatus calculates the driving evaluation score depending on the driving mode of the vehicle based on the driving image and the control parameter in operation 750. As will be described in detail below, different driving evaluation scores may be calculated for each driving mode of the vehicle and thus, different neural networks may be learned for each driving mode of the vehicle.

FIG. 8 illustrates a table illustrating an example of scores for a plurality of evaluation items and weights assigned to each of the evaluation items. The table of FIG. 8 is used to calculate a driving evaluation score. The table may include a plurality of preset evaluation items, a specific reference of each of the evaluation items, a weight of each of the evaluation items with respect to a driving image (feature vector or feature map corresponding to single driving image). For example, the table includes a score automatically assigned to each of the preset evaluation items based on a rule-based method. A plurality of tables may be varied depending on each driving image and each driving situation.

The evaluation items may include, for example, a time to collision (or safety degree), a steering angle, an accelerator pedal angle, and a decelerator pedal angle. However, the evaluation items are not limited thereto. The evaluation items may include various items for controlling the vehicle.

Each of the evaluation items may include a score and a weight based on the specific reference, for example, "safe", "slightly dangerous", "dangerous", and "crash". The specific reference "safe" indicates that a change rate for controlling the vehicle is small (minute change and minute control), and the specific reference "crash" indicates that the change rate is great (sudden change and sudden control). Each of the evaluation items may include, for example, scores corresponding to points 0 to 10, from "safe" to "crash".

For example, it may be more appropriate to drive quickly by slightly crossing over a center line without stopping driving to follow traffic regulations in the first situation 110 of FIG. 1. In a table for a driving image corresponding to the first situation 110, a relatively high score may be assigned to a control parameter that allows a vehicle to drive quickly by slightly crossing over the center line. For example, in order to avoid a crash with another vehicle parked in a right lane in the first situation 110, a relatively high score is assigned to "crash" corresponding to sudden steering with respect to an evaluation item "steering angle B", and a relatively high score is assigned to "crash" corresponding to a sudden push of an accelerator pedal for fast driving with respect to an evaluation item "accelerator pedal angle C".

In addition, it may be more appropriate to wait to drive until another vehicle parked in the driving lane starts moving, or until after the driving vehicle in the opposite lane passes instead of crossing over the center line in the second situation 130 of FIG. 1. In a table for a driving image corresponding to the second situation 130, a relatively high score may be assigned to a control parameter that allows a vehicle to wait to drive until another vehicle parked in the driving lane starts moving or until after the driving vehicle in the opposite lane passes. For example, in the second situation 130, in order to stop the currently driving vehicle, a relatively high score is assigned to "crash" corresponding to a sudden push of a decelerator pedal with respect to an evaluation item "decelerator pedal angle D".

In an example, a driving method may be varied depending on a driving mode (or driving habit of user), for example, an eco mode and a sport mode, of a vehicle even in a same situation. Thus, a score or a weight of each specific reference may be differently set based on the driving mode (or driving habit of user) of the vehicle. In an example, a table may be provided by scoring a driving habit of a user in each situation in advance. A final driving evaluation score may be obtained as illustrated in FIG. 9 by adding up weighted values of respective evaluation items.

FIG. 9 illustrates examples of a method of calculating a driving evaluation score. FIG. 9 illustrates graphs 910 and 930 each indicating scores for each of preset evaluation items. For example, FIG. 9 may illustrate graphs 910 and 930 each indicating scores for each of preset evaluation items inadequate (sudden) steering and normal acceleration, respectively. FIG. 9 also illustrates a graph 950 indicating driving evaluation scores that are finally calculated by assigning weights corresponding to a driving mode of a vehicle to the scores for each of evaluation items.

For example, it is assumed that a control parameter corresponding to a driving image is associated with [steering angle: right 20 degrees, acceleration: 10 km/s]. In this example, it is assumed that a score for inadequate (sudden) steering, for example, 20 degrees of a steering angle, is 5, and a score for a normal acceleration, for example, 10 km/s of an acceleration, is 7. In addition, it is assumed that a weight for the inadequate steering is 0.5 and a weight for a normal acceleration and deceleration control, for example, 10 km/s of an acceleration, is 1, because a driving mode of a vehicle is set to be an eco mode.

A driving evaluation score may be obtained as score (5) corresponding to 20 degrees of steering angle×weight (0.5)+score (7) corresponding to 10 km/s of acceleration×weight (1)=2.5+7=9.5. A peak value in the graph 950 may correspond to 9.5.

A learning apparatus may calculate the driving evaluation score by assigning different weights depending on the driving mode to the scores for each of the evaluation items in a multidimensional graph.

Figure 10:
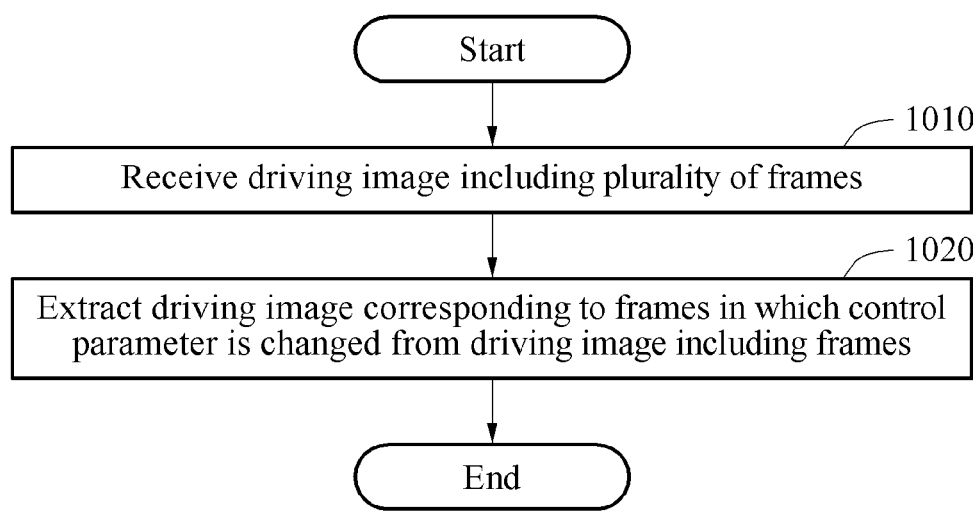
FIG. 10 is a flowchart illustrating an example of a method of obtaining a driving image.

FIG. 10 is a flowchart illustrating an example of a method of obtaining a driving image. FIG. 10 illustrates an example of a method by which a learning apparatus of FIGS. 4 and 7 obtains a driving image.

In operation 1010, the learning apparatus receives a driving image including a plurality of frames. The driving image may be photographed by an image sensor of a driving vehicle.

In operation 1020, the learning apparatus extracts a driving image corresponding to frames in which a control parameter is changed, from the driving image received in operation 1010.

For example, it is assumed that a driver drives straight at 50 kilometers. The driver may reduce a speed of a vehicle from 50 kilometers to 20 kilometers between 10 minutes and 30 seconds and 10 minutes and 50 seconds, and then turn the wheel to the right because of an obstacle. In this case, the learning apparatus may extract, from all driving images, a driving image corresponding to frames corresponding to a time interval during which a control parameter is changed, that is, frames from 10 minutes and 30 seconds to 10 minutes and 50 seconds after a start of driving.

Figure 11:
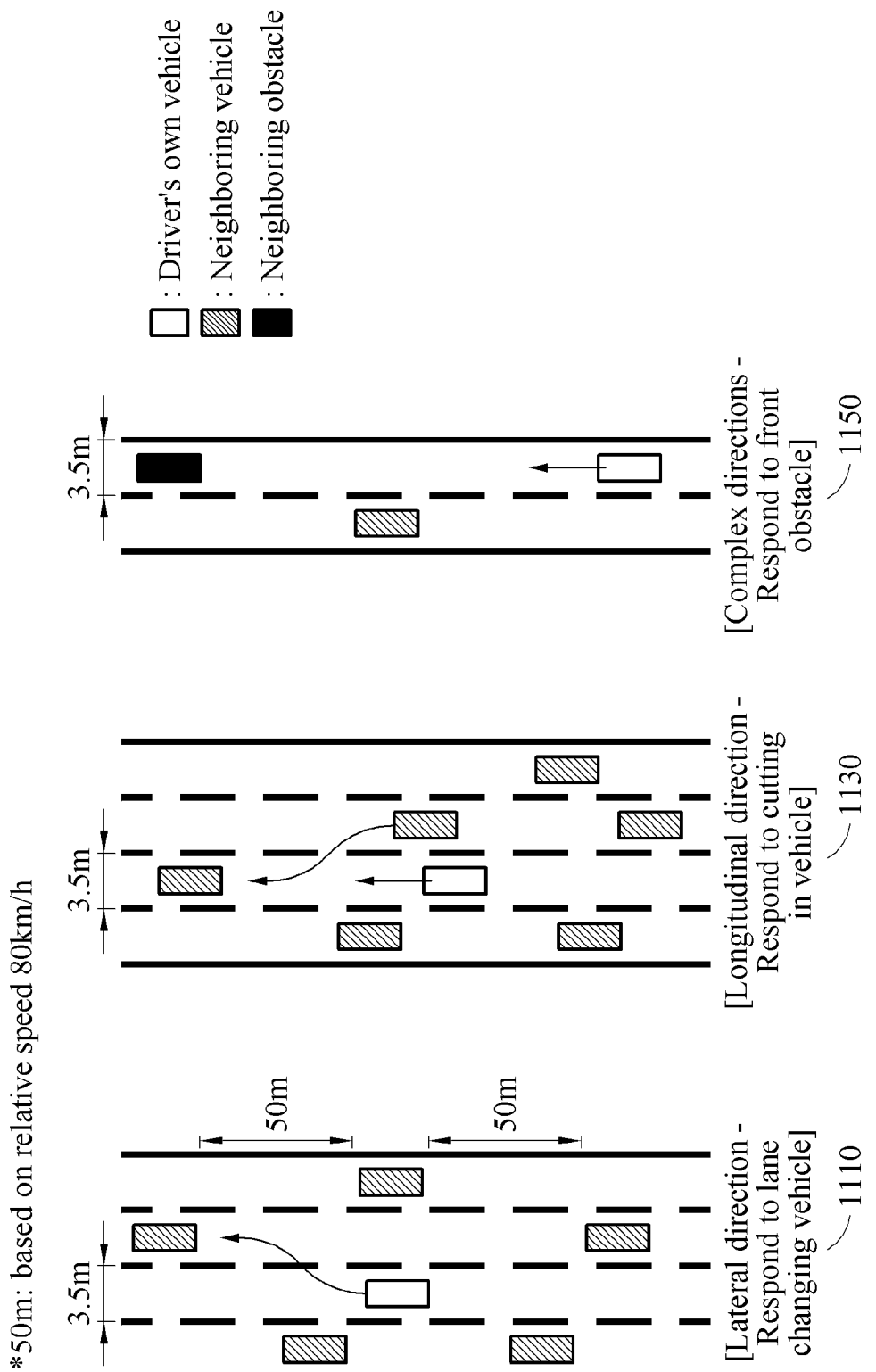
FIG. 11 illustrates examples of controlling a vehicle differently depending on a driving situation and a driving mode of the vehicle.

FIG. 11 illustrates examples of controlling a vehicle differently depending on a driving situation and a driving mode of the vehicle. FIG. 11 illustrates a situation 1110 in which a driving vehicle (driver's own vehicle) is to change a lane, a situation 1130 in which a neighboring vehicle is cutting in front of the driving vehicle (driver's own vehicle), and a situation 1150 in which an obstacle appears in front of the driving vehicle (driver's own vehicle).

When the driver's own vehicle is to change a lane from a second lane in which the driver's own vehicle is currently driving to a third lane which is a right lane of the second lane as in the situation 1110, the driver's own vehicle may ensure a distance (safety distance) between a front vehicle and a rear vehicle, and consider two lanes including the third lane and the next fourth lane.

The control apparatus may determine a control parameter for a lane change to the third lane by applying a driving image of the situation 1110 to a pre-learned neural network.

The control apparatus may determine information corresponding to the situation 1110 by applying the driving image of the situation 1110 to a first pre-learned neural network, resulting in the determined information corresponding to the situation 1110. The determined information may include a feature vector including information, for example, positions of the front vehicle and the rear vehicle, distances (safety distances) between the front vehicle and the rear vehicle, speeds of the front vehicle and the rear vehicle, and widths of the third lane and the fourth lane. The control apparatus may determine a second parameter for the lane change to the third lane by applying the information corresponding to the situation 1110 and a first control parameter for a vehicle control in the situation 1110 to a second pre-learned neural network.

Here, a driving method in the situation 1110 may be different depending on a driving mode of the vehicle. For example, in response to the driving mode being an eco mode, a relatively great weight is assigned to a gradual acceleration and a gradual right steering, and a control parameter or a second control parameter corresponding to the gradual acceleration and the gradual right steering may be determined. In response to the driving mode being a sport mode, a relatively great weight is assigned to a sudden acceleration and a sudden right steering, and a control parameter or a second control parameter corresponding to the sudden acceleration and the sudden right steering may be determined.

Also, when the neighboring vehicle cuts in front of the driver's own vehicle as in the situation 1130, the driver's own vehicle may consider a distance from the front vehicle in addition to a distance from the neighboring vehicle that cuts in front of the driver's own vehicle.

Here, the control apparatus may determine a control parameter for a vehicle that cuts in by applying a driving image of the situation 1130 to the pre-learned neural network.

The control apparatus may determine information corresponding to the situation 1130 by applying the driving image of the situation 1130 to the first pre-learned neural network. Here, the information corresponding to the situation 1130 may include a feature vector or a feature map including information, for example, a distance from a front vehicle, a distance from a vehicle that cuts in, speeds of the front vehicle and the vehicle that cuts in, and a width of a second lane. The control apparatus may determine a second control parameter for the vehicle that cuts in by applying the information corresponding to the situation 1130 and a first control parameter for the vehicle control in the situation 1130 to the second pre-learned neural network.

Here, distances between the driver's own vehicle, the vehicle that cuts in front of the driver's own vehicle, and the front vehicle may be differently determined based on the driving mode. For example, in response to the driving mode being a sport mode, a weight is assigned to a narrow distance between vehicles of a relatively low safety degree. In response to the driving mode being a safety mode, a weight is assigned to a wide distance between vehicles of a relatively high safety degree. In the situation 1130, based on the driving mode, the control apparatus may determine a second control parameter that allows the distance between the driver's own vehicle and the vehicle that cuts in front of the driver's own vehicle to be narrow, and determine a second parameter that allows the distance between the driver's own vehicle and the vehicle that cuts in front of the driver's own vehicle to be wide.

In addition, when the obstacle appears in front of the vehicle that is driving in a second lane as in the situation 1150, the driver's own vehicle may consider a first driving method of driving fast to pass the obstacle when an opposite lane is empty even if the driver's own vehicle crosses a center line, and a second driving method of stopping driving and restarting the vehicle when the front obstacle, for example, a vehicle on a side road, and a vehicle in an opposite direction are stopped.

The control apparatus may determine a control parameter for a case in which the obstacle appears in front of the driver's own vehicle by applying the driving image to the pre-learned neural network.

The control apparatus may determine information corresponding to the situation 1150 by applying a driving image of the situation 1150 to the first pre-learned neural network. Here, the information corresponding to the situation 1150 may include a feature vector including information, for example, a position of a front obstacle, a distance between the front obstacle and the driver's own vehicle, a speed and a position of a neighboring vehicle that is driving in an opposite lane, and widths of the opposite lane and a lane in which the driver's own vehicle is driving. The control apparatus may determine a second control parameter for a case in which the obstacle appears in front of the driver's own vehicle by applying the information corresponding to the situation 1150 and the first control parameter for the vehicle control in the situation 1150 to the second pre-learned neural network.

For example, it is assumed that a diving evaluation score of the first driving method of driving fast to pass the obstacle is higher than a driving evaluation score of the second driving method in the table of FIG. 8. A learning apparatus may allow a neural network (or second neural network) to learn a control parameter (or second control parameter) according to the first driving method a relatively great number of times (corresponding to learning weights), based on a learning weight corresponding to the driving evaluation score. Thus, the control apparatus may control a vehicle using the control parameter (or second control parameter) corresponding to the first driving method.

Here, weights assigned to scores for each of the evaluation items of FIG. 8 may be varied depending on the driving mode of the vehicle and thus, a driving evaluation score for each driving method may be varied. When the driving evaluation score for each driving method is varied, the learning apparatus may vary a number of learning times (corresponding to learning weights) of the control parameter (or second control parameter) based on each driving method. Thus, the control parameter (or second control parameter) determined in response to the situation 1350 may be also varied.

An effective driving method may be varied depending on the driving mode of the vehicle and various situations even in a same place.

Figure 12:
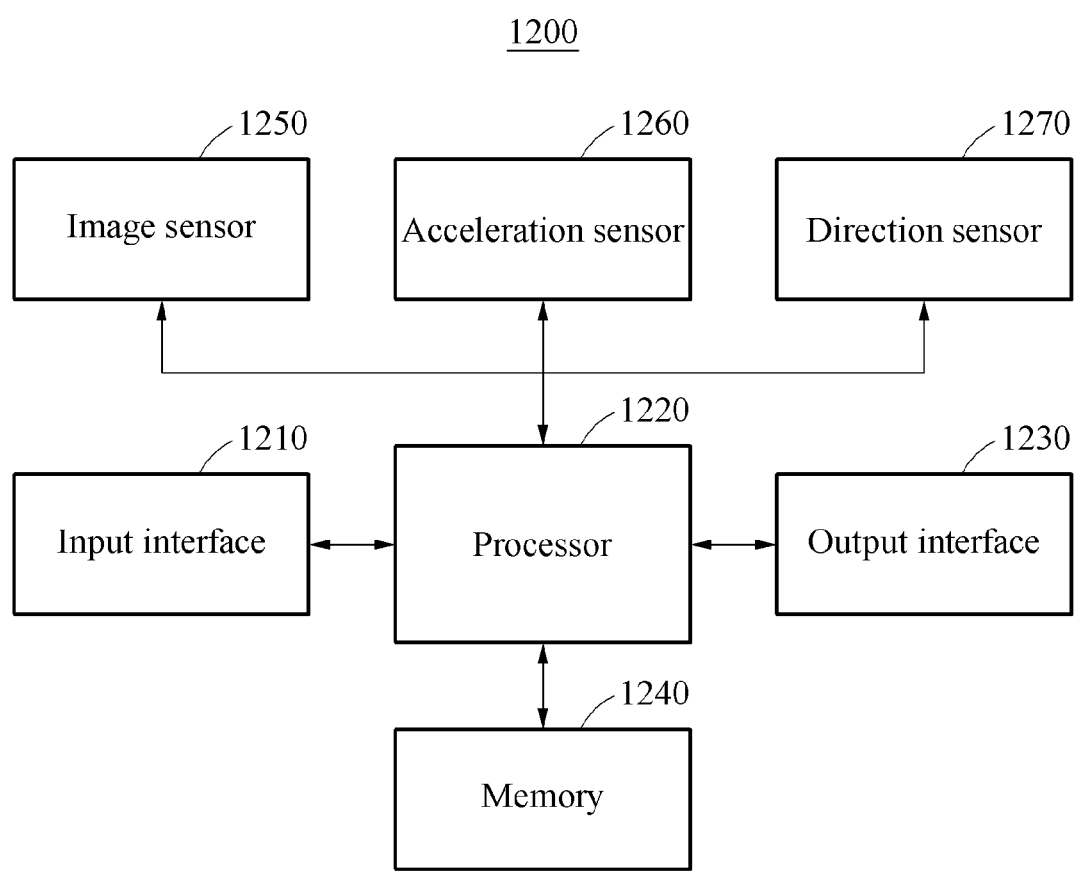
FIG. 12 is a block diagram illustrating an example of a vehicle control apparatus for autonomous driving.

FIG. 12 is a block diagram illustrating an example of a vehicle control apparatus for autonomous driving. Referring to FIG. 12, a vehicle control apparatus, hereinafter referred to as a control apparatus 1200, for autonomous driving includes an input interface 1210, a processor 1220, and an output interface 1230. The control apparatus 1200 further includes a memory 1240, an image sensor 1250, an acceleration sensor 1260, and a direction sensor 1270.

The input interface 1210 obtains a driving image of a vehicle. For example, the driving image of the vehicle may be photographed by the image sensor 1250 included in the control apparatus 1200. Alternatively, the driving image of the vehicle may be photographed by an image sensor disposed in the vehicle.

The processor 1220 determines a control parameter for controlling the vehicle in response to a driving situation of the vehicle by applying the driving image to a neural network. In an example, the neural network includes first layers in a convolutional structure and second layers in a recurrent structure. The driving image is applied to a first layer among the first layers, a last layer among the first layers is connected with a first layer among the second layers, and the control parameter is output from a last layer among the second layers. In this example, the output interface 1230 transmits control parameters to an electronic control unit (ECU) of the vehicle to enable the vehicle to drive autonomously.

The processor 1220 determines information corresponding to the driving situation based on the driving image. The processor 1220 obtains a first control parameter for controlling the vehicle at a first point in time at which the driving image is obtained. The processor 1220 determines a second control parameter for controlling the vehicle at a second point in time subsequent to the first point in time based on the information corresponding to the driving situation and the first control parameter. Here, the output interface 1230 transmits the second control parameter determined by the processor 1220 to the ECU of the vehicle to enable the vehicle to drive autonomously. Alternatively, the processor 1220 may be a processor of the ECU Also, the processor 1220 may perform any one or any combination of any two or more of the above-described methods provided with reference to FIGS. 1 through 11. The processor 1220 may execute a program and control the control apparatus 1200. A program code executed by the processor 1220 may be stored in the memory 1240.

The memory 1240 stores the driving image of the vehicle. The driving image may be labeled and stored for a learning operation. Information stored in the memory 1240 may be used for learning for a vehicle control in each neural network. Also, the memory 1240 stores a learned parameter, e.g., a trained connection weight, of a neural network (or, first neural network and second neural network). The neural network may operate based on the learned parameter.

The memory 1240 stores various pieces of information generated in the above-described processing process of the processor 1220. Also, the memory 1240 may store various data and programs. The memory 1240 may include a volatile memory or a non-volatile memory. The memory 1240 may include a large volume of storage medium, for example, a hard disk, to store various data.

The image sensor 1250 photographs the driving image including a plurality of frames. The processor 1220 may extract a driving image corresponding to frames in which any one or any combination of any two or more of the control parameters is changed among the control parameters, from the driving image.

The acceleration sensor 1260 senses a driving speed of the vehicle including the control apparatus 1200.

The direction sensor 1270 senses a driving direction and a steering direction of the vehicle including the control apparatus 1200. The direction sensor 1270 may include a global positioning system (GPS) for tracking a driving path.

The vehicle control apparatus, the input interface 1210, the processor 1220, the output interface 1230, the memory 1240, the image sensor 1250, the acceleration sensor 1260, and the direction sensor 1270 in FIGS. 1-12 that perform the operations described in this application are implemented by hardware components configured to perform the operations described in this application that are performed by the hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods illustrated in FIGS. 1-12 that perform the operations described in this application are performed by computing hardware, for example, by one or more processors or computers, implemented as described above executing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control computing hardware, for example, one or more processors or computers, to implement the hardware components and perform the methods as described above may be written as computer programs, code segments, instructions or any combination thereof, for individually or collectively instructing or configuring the one or more processors or computers to operate as a machine or special-purpose computer to perform the operations that are performed by the hardware components and the methods as described above. In one example, the instructions or software include machine code that is directly executed by the one or more processors or computers, such as machine code produced by a compiler. In another example, the instructions or software includes higher-level code that is executed by the one or more processors or computer using an interpreter. The instructions or software may be written using any programming language based on the block diagrams and the flow charts illustrated in the drawings and the corresponding descriptions in the specification, which disclose algorithms for performing the operations that are performed by the hardware components and the methods as described above.

The instructions or software to control computing hardware, for example, one or more processors or computers, to implement the hardware components and perform the methods as described above, and any associated data, data files, and data structures, may be recorded, stored, or fixed in or on one or more non-transitory computer-readable storage media. Examples of a non-transitory computer-readable storage medium include read-only memory (ROM), random-access memory (RAM), flash memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, magnetic tapes, floppy disks, magneto-optical data storage devices, optical data storage devices, hard disks, solid-state disks, and any other device that is configured to store the instructions or software and any associated data, data files, and data structures in a non-transitory manner and provide the instructions or software and any associated data, data files, and data structures to one or more processors or computers so that the one or more processors or computers can execute the instructions. In one example, the instructions or software and any associated data, data files, and data structures are distributed over network-coupled computer systems so that the instructions and software and any associated data, data files, and data structures are stored, accessed, and executed in a distributed fashion by the one or more processors or computers.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A processor-implemented vehicle control method for autonomous driving, the processor-implemented vehicle control method comprising:
   obtaining a driving image of a vehicle;
   determining first information corresponding to a driving situation by applying the driving image to a first neural network configured to recognize the driving situation;
   obtaining a first control parameter for controlling the vehicle at a first point in time at which the driving image is obtained;
   determining a second control parameter for controlling the vehicle at a second point in time subsequent to the first point in time based on the first information corresponding to the driving situation and the first control parameter; and
   transmitting the second control parameter to an electronic control unit (ECU) of the vehicle for controlling the vehicle to drive autonomously.

2. The processor-implemented vehicle control method of claim 1, wherein each of the first control parameter and the second control parameter comprises either one or both of steering information and acceleration and deceleration information.

3. The processor-implemented vehicle control method of claim 1, wherein the first information corresponding to the driving situation comprises a feature vector including information of any one or any combination of any two or more of a position of a neighboring object of the vehicle, a speed of the neighboring object, a distance between the neighboring object and the vehicle, a lane of a road on which the vehicle is driving, a neighboring lane of the lane, and a width of the road.

4. The processor-implemented vehicle control method of claim 1, wherein the first neural network comprises a pre-learned convolutional neural network to recognize the driving situation based on the driving image.

5. The processor-implemented vehicle control method of claim 1, wherein the determining of the second control parameter comprises obtaining the second control parameter by applying the first information corresponding to the driving situation and the first control parameter to a second neural network configured to predict the second control parameter.

6. The processor-implemented vehicle control method of claim 5, wherein the second neural network comprises a pre-learned recurrent neural network to generate the second control parameter based on the first information corresponding to the driving situation and the first control parameter.

7. The processor-implemented vehicle control method of claim 1, wherein the determining of the second control parameter comprises:
   receiving a driving mode of the vehicle; and
   obtaining the second control parameter by applying the first information corresponding to the driving situation and the first control parameter to a second neural network corresponding to the driving mode of the vehicle.

8. A processor-implemented learning method comprising:
   obtaining a driving image of a vehicle;
   determining first information corresponding to a driving situation by applying the driving image to a first neural network configured to recognize the driving situation in the driving image;
   obtaining a first control parameter for controlling the vehicle at a first point in time at which the driving image is obtained;
   calculating a driving evaluation score based on the first information corresponding to the driving situation and the first control parameter; and
   learning a second neural network configured to predict a second control parameter for controlling the vehicle at a second point in time subsequent to the first point in time based on a learning weight corresponding to the driving evaluation score.

9. The processor-implemented learning method of claim 8, wherein the learning of the second neural network comprises repeatedly learning the second neural network a number of times corresponding to the learning weight.

10. The processor-implemented learning method of claim 8, wherein the calculating comprises any one or any combination of any two or more of:
   determining the driving evaluation score based on the first control parameter and the first information corresponding to the driving situation;
   determining the driving evaluation score based on the first information corresponding to the driving situation, the first control parameter and on a lookup table, wherein the lookup table stores driving evaluation scores based on a predetermined scene and a predetermined first control parameter corresponding to the first information corresponding to the driving situation in the predetermined scene; and calculating the driving evaluation score by assigning a score to each of a plurality of preset evaluation items based on the first information corresponding to the driving situation and the first control parameter.

11. The processor-implemented learning method of claim 8, wherein the obtaining of the driving image comprises:
receiving the driving image including a plurality of frames; and
extracting, from the plurality of frames, a first frame corresponding to a change in the first control parameter.

12. The processor-implemented learning method of claim 8, wherein:
the first neural network comprises a pre-learned convolutional neural network configured to output the first information corresponding to the driving situation by recognizing the driving situation based on a scene of the driving image; and
the second neural network comprises a pre-learned recurrent neural network configured to generate the second control parameter for controlling the vehicle at the second point in time subsequent to the first point in time based on the driving evaluation score,
wherein the driving evaluation score is based on scores for each of a plurality of preset evaluation items, and the scores are based on either one or both of the first information corresponding to the driving situation and the first control parameter.

13. The processor-implemented learning method of claim 8, further comprising:
receiving a driving mode of the vehicle,
wherein the calculating of the driving evaluation score comprises calculating the driving evaluation score by assigning different weights corresponding to the driving mode of the vehicle to scores for each of a plurality of preset evaluation items, wherein the scores are based on either one or both of the driving image and the first control parameter.

14. A non-transitory computer-readable storage medium storing instructions that, when executed by a processor, cause the processor to perform the method of claim 1.

15. A vehicle control apparatus for autonomous driving, the vehicle control apparatus comprising:
an input interface configured to receive a driving image of a vehicle;
a processor configured to determine a control parameter for controlling the vehicle in response to a driving situation of the vehicle by applying the driving image to a neural network; and
an output interface configured to transmit the control parameter to an electronic control unit (ECU) of the vehicle for controlling the vehicle to drive autonomously,
wherein the neural network comprises first layers in a convolutional structure and second layers in a recurrent structure, the driving image is applied to a selected first layer among the first layers, a last layer among the first layers is connected with a selected second layer among the second layers, and the control parameter is output from a last layer among the second layers.

16. A vehicle control apparatus for autonomous driving, the vehicle control apparatus comprising:
an input interface configured to receive a driving image of a vehicle;
a processor configured to:
determine first information corresponding to a driving situation by applying the driving image to a first neural network configured to recognize the driving situation,
obtain a first control parameter for controlling the vehicle at a first point in time at which the driving image is obtained, and
determine a second control parameter for controlling the vehicle at a second point in time subsequent to the first point in time based on the information corresponding to the driving situation and the first control parameter; and
an output interface configured to transmit the second control parameter to an electronic control unit (ECU) of the vehicle for controlling the vehicle to drive autonomously.

* * * * *